(12) United States Patent
Lundgren

(10) Patent No.: US 8,585,098 B2
(45) Date of Patent: Nov. 19, 2013

(54) HYDRAULIC CONNECTION

(75) Inventor: Bertil Lundgren, Bjärtrå (SE)

(73) Assignee: Nordhydraulic AB, Kramfors (SE)

( * ) Notice: Subject to any disclaimer, the term of this patent is extended or adjusted under 35 U.S.C. 154(b) by 352 days.

(21) Appl. No.: 12/516,866

(22) PCT Filed: Nov. 19, 2007

(86) PCT No.: PCT/SE2007/050869
§ 371 (c)(1),
(2), (4) Date: May 29, 2009

(87) PCT Pub. No.: WO2008/066479
PCT Pub. Date: Jun. 5, 2008

(65) Prior Publication Data
US 2010/0066076 A1    Mar. 18, 2010

(30) Foreign Application Priority Data

Dec. 1, 2006 (SE) ........................ 0602576

(51) Int. Cl.
*F16L 39/00* (2006.01)

(52) U.S. Cl.
USPC .......... 285/124.4; 285/124.2; 285/45; 285/62

(58) Field of Classification Search
USPC ............. 285/124.1, 124.2, 124.3, 124.4, 401, 285/402, 45, 62, 63; 172/273, 813; 414/723
See application file for complete search history.

(56) References Cited

U.S. PATENT DOCUMENTS

| | | | | |
|---|---|---|---|---|
| 2,788,991 | A * | 4/1957 | Neuhauser | 285/124.1 |
| 3,527,480 | A * | 9/1970 | Larson | 285/124.1 |
| 4,544,185 | A | 10/1985 | Weirich et al. | |
| 5,316,347 | A | 5/1994 | Arosio | |
| 5,333,400 | A * | 8/1994 | Sonerud | 414/723 |
| 5,417,459 | A * | 5/1995 | Gray et al. | 285/124.1 |
| 5,507,530 | A * | 4/1996 | Mahaney | 285/124.1 |
| 5,829,337 | A * | 11/1998 | Barden | 285/26 |
| 5,984,371 | A * | 11/1999 | Mailleux | 285/26 |
| 5,988,697 | A * | 11/1999 | Arosio | 285/124.1 |
| 6,017,065 | A * | 1/2000 | Hellesøe | 285/124.2 |
| 6,443,498 | B1 * | 9/2002 | Liao | 285/124.1 |
| 6,543,563 | B1 * | 4/2003 | Muraro | 180/89.12 |
| 6,776,421 | B2 * | 8/2004 | Florence et al. | 285/124.2 |
| 6,860,290 | B2 * | 3/2005 | Knuthson | 285/124.1 |
| 6,899,509 | B1 | 5/2005 | Mailleux | |
| 7,021,668 | B2 * | 4/2006 | Langenfeld et al. | 285/124.1 |
| 7,083,202 | B2 * | 8/2006 | Eberle et al. | 285/124.4 |

(Continued)

FOREIGN PATENT DOCUMENTS

| | | |
|---|---|---|
| JP | 80049253 | 2/1996 |
| JP | 2002333088 | 11/2002 |

*Primary Examiner* — David E Bochna
(74) *Attorney, Agent, or Firm* — Stites & Harbison PLLC; Marvin Petry

(57) ABSTRACT

For a hydraulic system of a work vehicle, a fixed connector part fixedly arranged thereon. A fixed connector part has a plurality of hydraulic couplings. A hydraulic work system of a work equipment has hydraulic couplings which are either a movable part having a plurality of hydraulic couplings or a plurality of individual hydraulic connections, each having a hydraulic coupling. The movable connector part is connectable to the fixed connector part by a locking device. The hydraulic couplings of the fixed connector part are constructed to be hydraulically coupled to the hydraulic couplings of the movable connector part and alternatively to the hydraulic couplings of the plurality of individual hydraulic couplings.

16 Claims, 6 Drawing Sheets

(56) References Cited

U.S. PATENT DOCUMENTS

Figure 16:
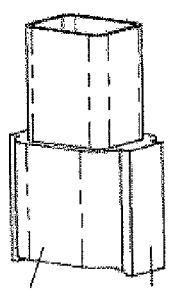

| | | | | |
|---|---|---|---|---|
| 7,258,369 B2* | 8/2007 | Martin | ........................ | 285/124.4 |
| 7,464,967 B2* | 12/2008 | Mieger et al. | .............. | 285/124.1 |
| 7,686,563 B2* | 3/2010 | Frey et al. | ...................... | 414/723 |
| 7,703,812 B2* | 4/2010 | Asam et al. | ................. | 285/124.3 |
| 7,717,471 B2* | 5/2010 | Langenfeld et al. | ........ | 285/124.1 |
| 8,007,010 B2* | 8/2011 | Langenfeld et al. | ........ | 285/124.1 |

\* cited by examiner

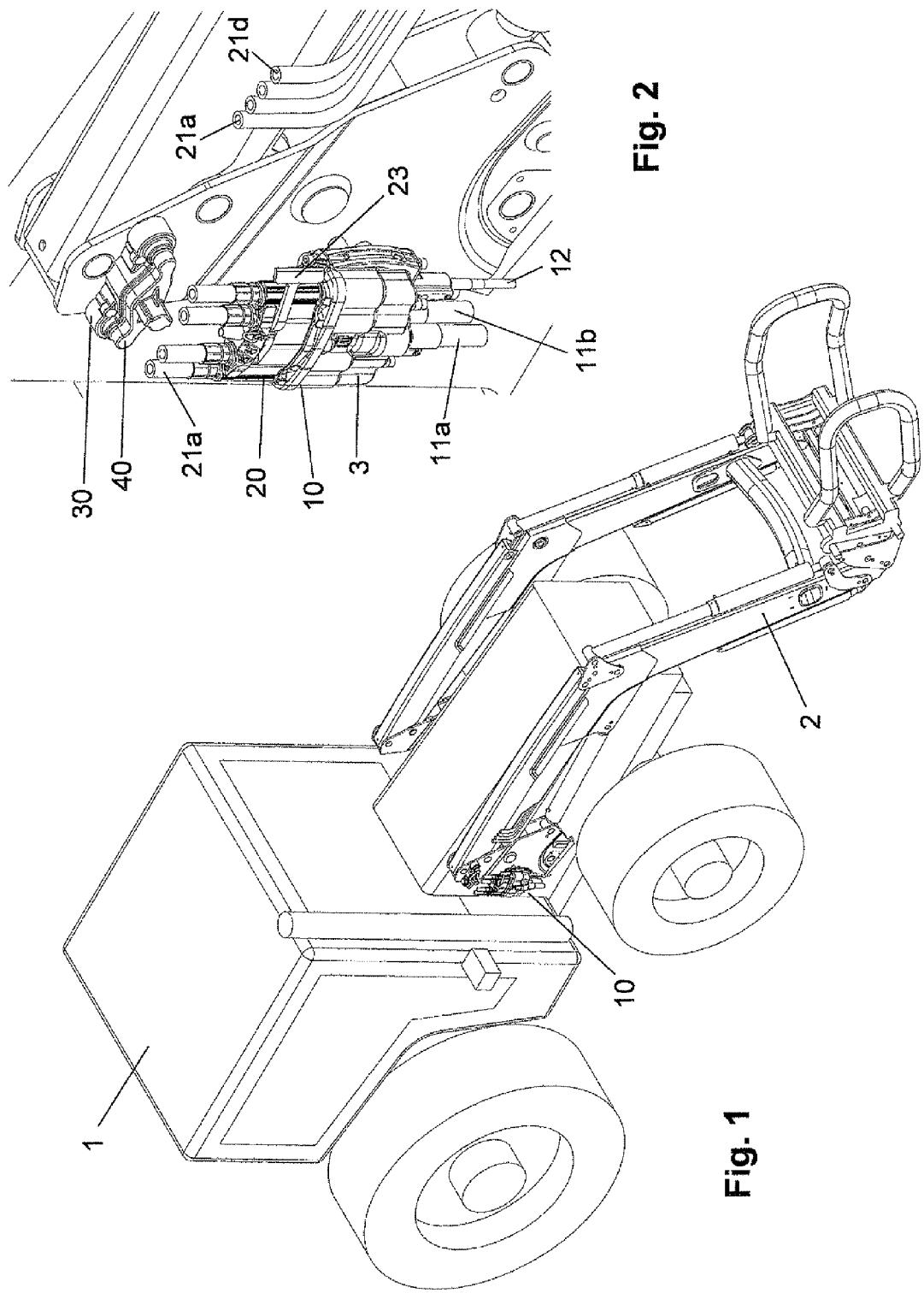

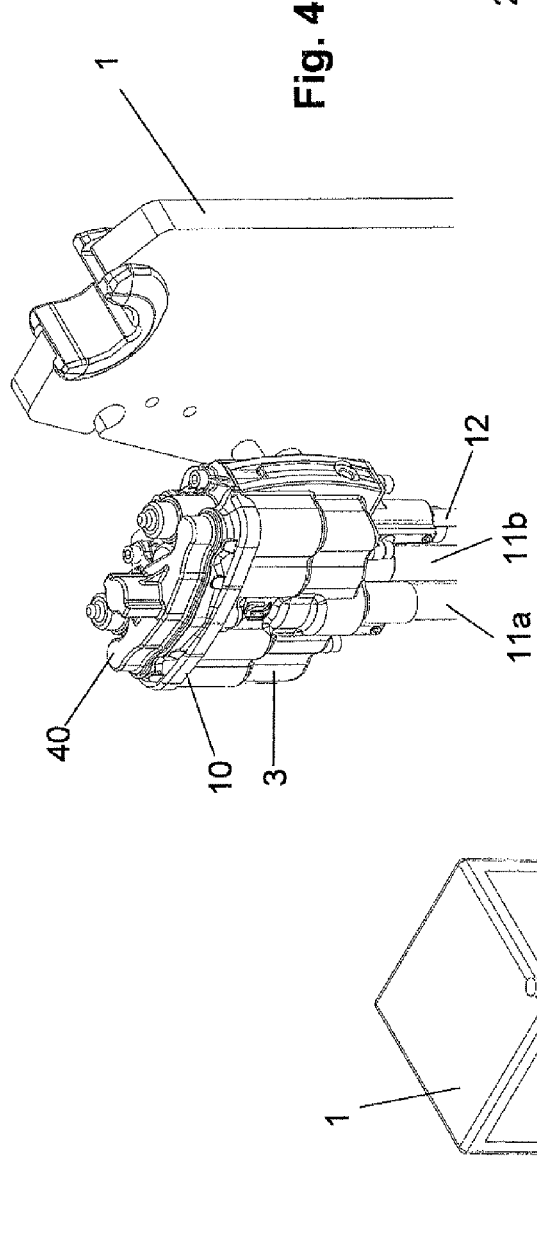
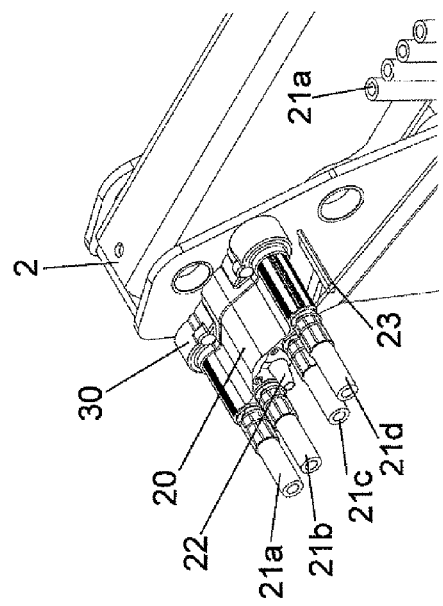
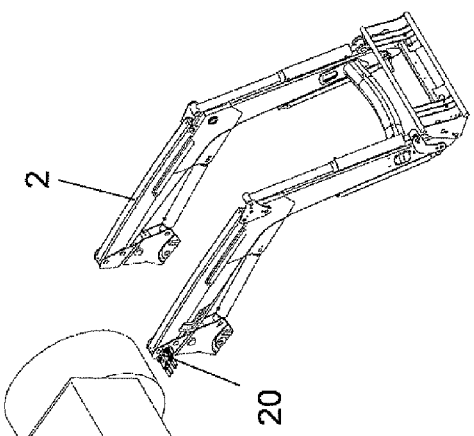

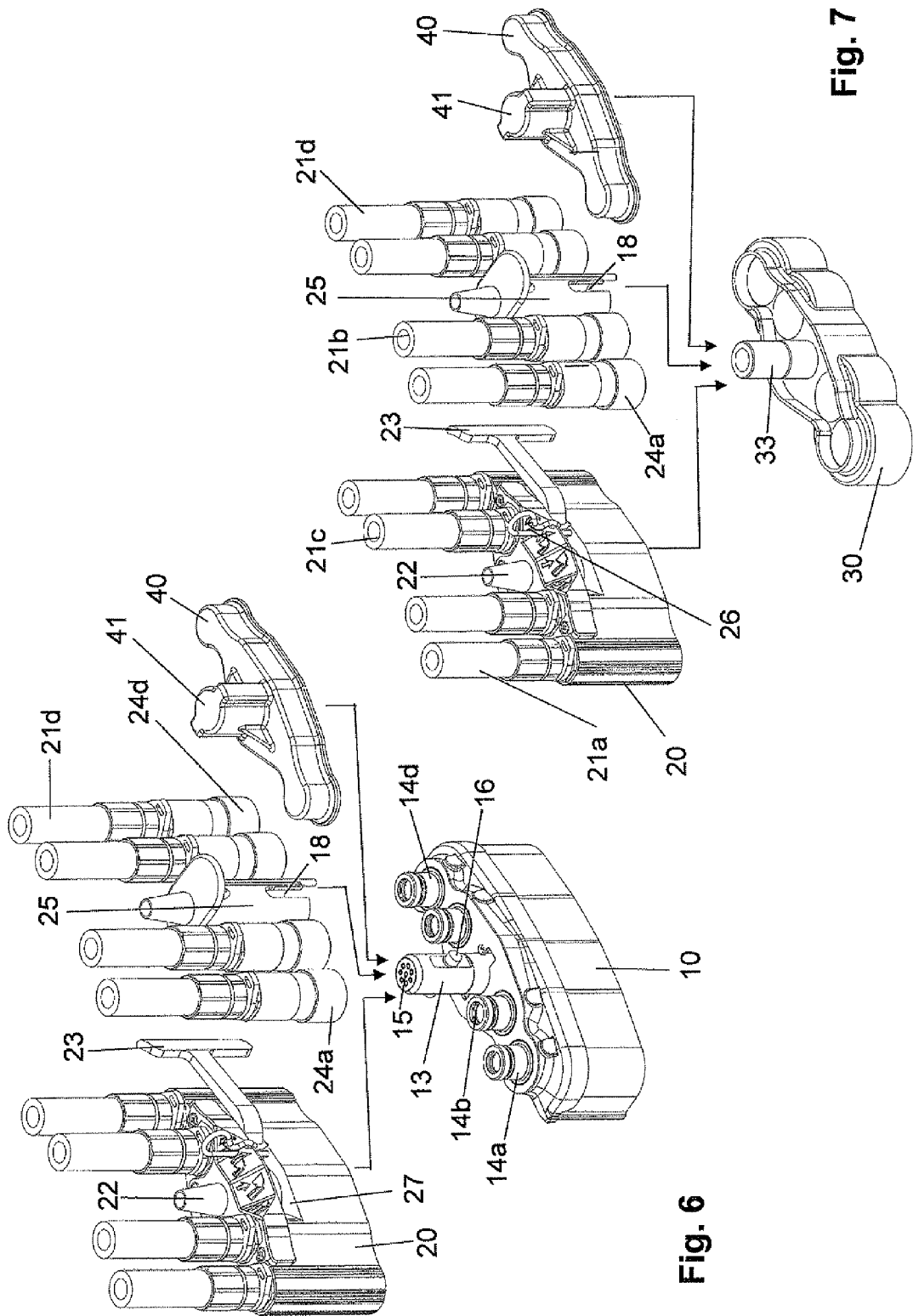

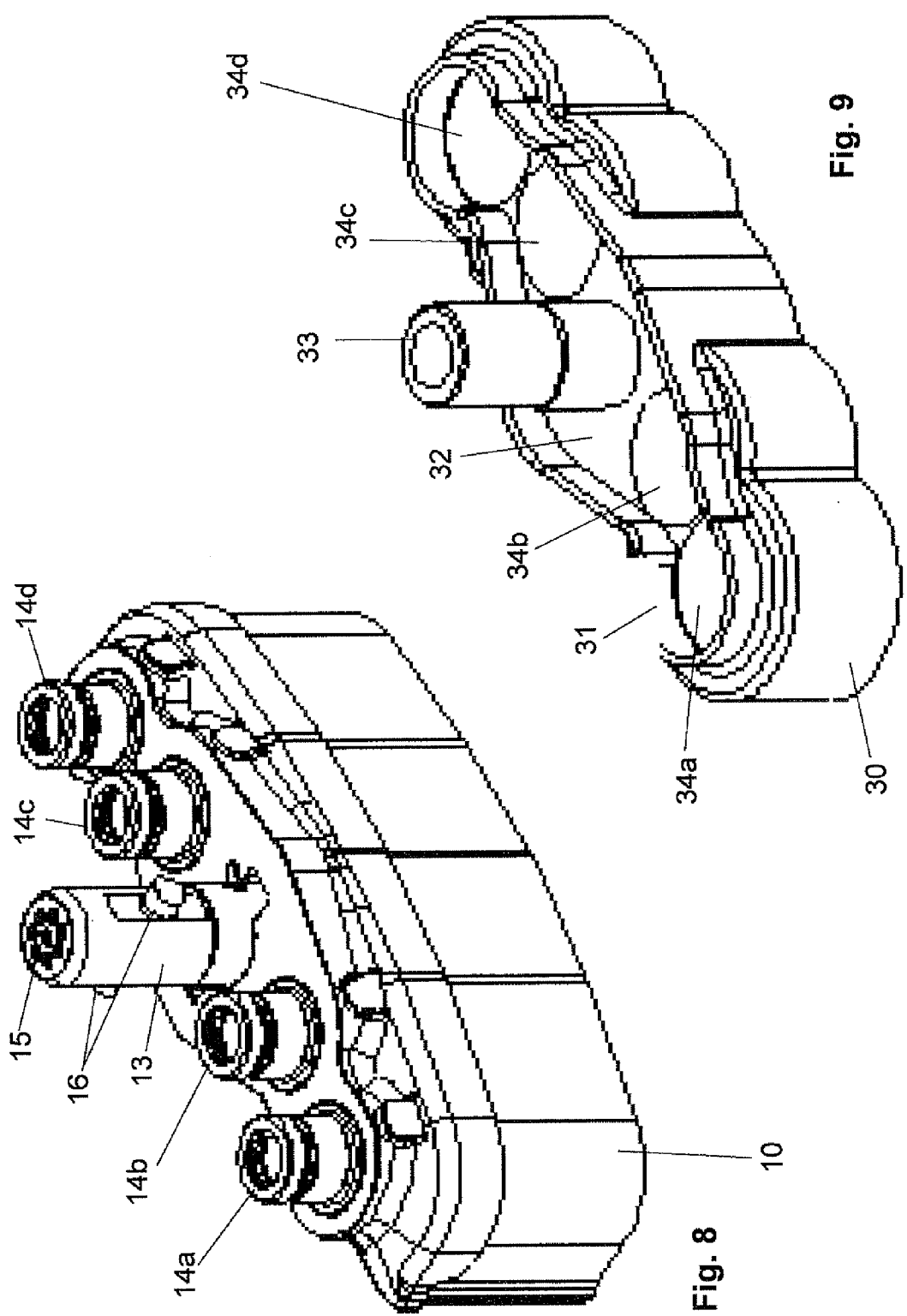

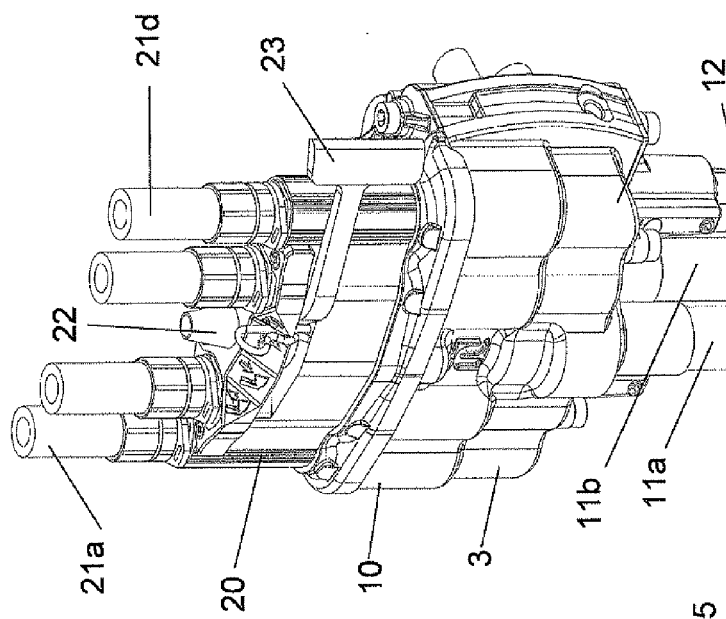
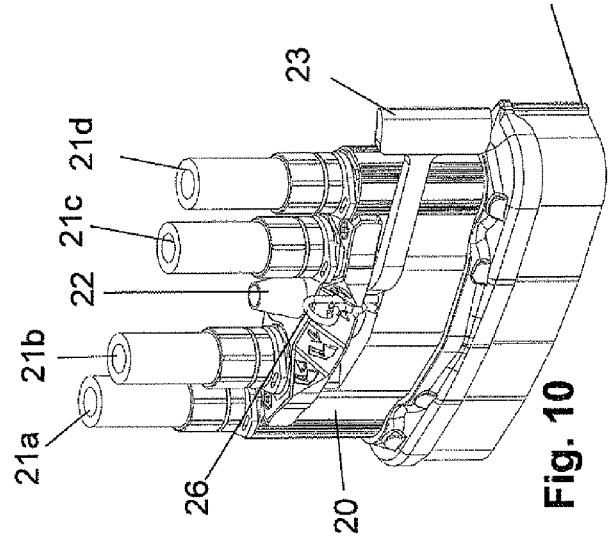
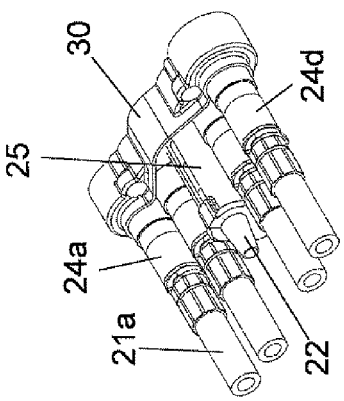
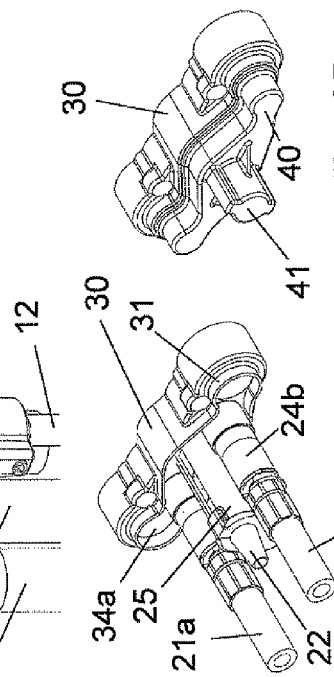
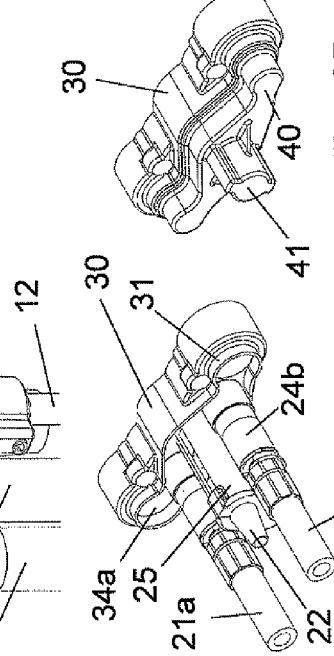
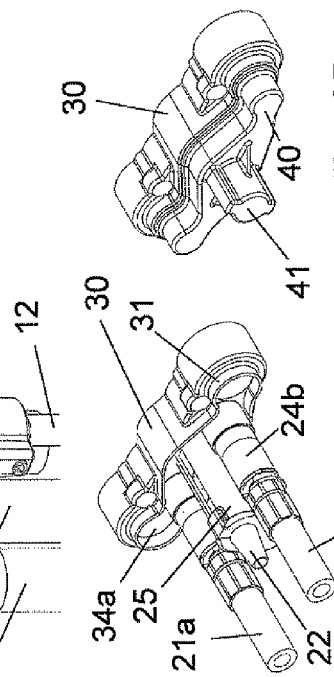

HYDRAULIC CONNECTION

TECHNICAL AREA

The present invention relates to a fixed connector part of a hydraulic system, and a hydraulic connection arrangement including such a fixed connector part.

BACKGROUND OF THE INVENTION

There are several applications where hydraulic connectors are utilized for inter-connecting hydraulically controlled equipments with systems of pressurized hydraulic fluid comprising control means such as valves for directing the pressurized fluid to different parts of the equipment and/or different functions of the equipment.

In many applications it is advantageous if the hydraulic connections are of a so called multi coupling type, with which it is possible to connect and disconnect the hydraulically controlled equipment from the source in one single operation. One such application is work vehicles for e.g. agricultural use, i.e. tractors, which utilize a number of different equipment such as digging aggregates, lifting aggregates, ploughs and the like. These are hydraulically operated via conduits and valve systems connected to a source of pressurized fluid, such as hydraulic pumps, which are driven by the engine of the work vehicle. Often, such an equipment is disconnected from the tractor when it is not to be used for a while, such that it may be replaced by another hydraulically controlled equipment.

A few systems for facilitating the operation of coupling the hydraulically controlled equipment to the work vehicle have been developed. One is disclosed in EP 0 522 493, in which hydraulic conduits are attached to carrier plates, one carrier plate being attached in a fixed position on e.g. a work vehicle, and the other carrier plate being arranged to the attachable equipment. The carrier plates are arranged with leakage proof quick-acting couplings. For connecting the couplings, a handle is pivotally arranged on the fixedly attached carrier plate, which co-operates with a couple of clamping pins arranged on the other carrier plate.

An obvious advantage of a multi coupling, such as the one described in EP 0 522 493 is of course that the exchange of equipments on the work vehicle may be easily and quickly performed. A drawback is however that once the work vehicle is supplied with such a carrier plate all equipment that are intended for use on that work vehicle, i.e. digging aggregates, lifting aggregates, ploughs etc., needs to be furnished with a corresponding carrier plate. This may infer heavy investment costs that are in some cases difficult to recover. Some of the equipments are only used once or twice a year, wherein such an investment is not worth wile.

Another drawback with the solution presented in EP 0 522 493 is that when the carrier plates are disconnected from each other, the couplings are not protected and are thus exposed to harming elements of the environment, such as dirt, debris, snow, rain and ice. This could adversely affect the hydraulic system, leading to malfunction and breakdown with rather costly repairs as a result.

BRIEF DESCRIPTION OF THE INVENTION

The aim of the present invention is to provide a fixed hydraulic connection, which is adaptable and easy to operate, but which does not infer the installation of costly hydraulic connections on all auxiliary equipments that are intended to be connected to the fixed hydraulic connection.

This is achieved according to the present invention by the features of claim 1. Preferable embodiments of the present invention are indicated in the dependent claims.

According to a first aspect, the invention relates to a fixed connector part, adapted to constitute an end part of a hydraulic system of a work vehicle and intended to be fixedly arranged on the work vehicle, the fixed connector part comprising: at least two hydraulic couplings; and a first locking means, which is intended to interact with a second locking means on a movable connector part, which constitutes an end part of a hydraulic system of a work equipment, wherein the first and second locking means are inter-connectable such that the hydraulic couplings of the fixed connector part and the movable connector part, respectively, may be simultaneously interconnected through the interaction of the first and second locking means. Further, each hydraulic coupling of the fixed connector part comprises individual couplings, such that each hydraulic coupling of the fixed connector part may be individually connected to separate hydraulic couplings.

An advantage of the present invention lies in the flexibility of the unit, residing in the fact that a work equipment may be used with and connected to the fixed connector part regardless of the type of coupling arranged on the work equipment.

Further, according to a second aspect, the invention relates to a hydraulic connection arrangement including a fixed connector part as described above.

The arrangement also comprises a movable connector part, which is adapted to be easily connected to the fixed connector part. Further, the arrangement preferably comprises a holding means for parking the movable connector part when it is detached from the fixed connector part, and a cover for protecting the fixed connector part when the movable connector part is not connected to it. The cover is preferably adapted to protect the holding means when the movable connector part is connected to the fixed connector part.

Thus, the holding means and the cover provide a full protection for the connector parts. Both the fixed connector part and the movable connector part may be protected from the environment at all times. Additionally the holding means is also protected at all times.

These and other aspects and advantages of the present invention will become apparent from the following detailed description of the invention and from the accompanying drawings.

SHORT DESCRIPTION OF THE DRAWINGS

Figure 17:
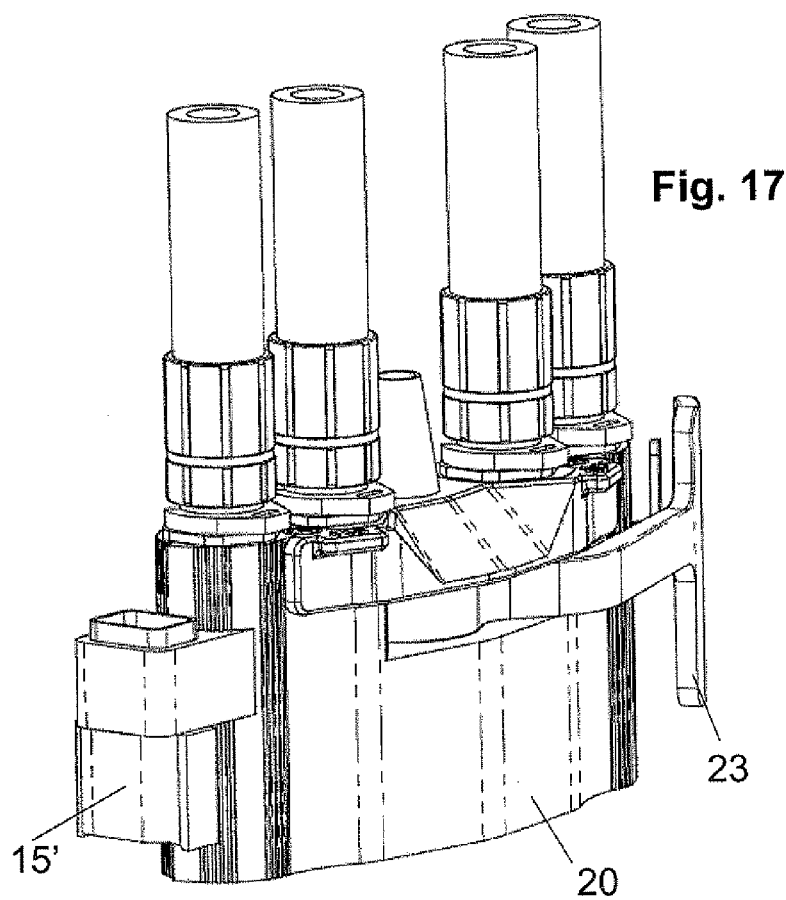
Figure 18:
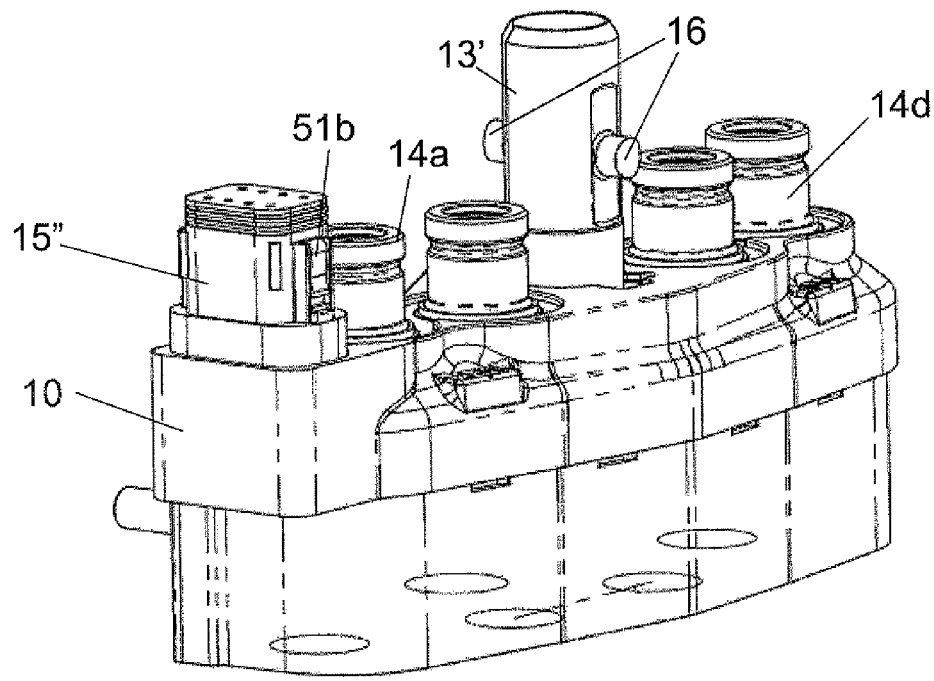

In the following detailed description of the invention, reference will be made to the accompanying drawings, of which:

FIG. 1 shows a work vehicle provided with a fixed connector part according to the invention, wherein a work equipment with a movable connector part is connected to the work vehicle, FIG. 2 shows a detailed view of the fixed connector part of FIG. 1, FIG. 3 shows a work vehicle with a disconnected work equipment, FIG. 4 shows a detailed view of the fixed connector part of the hydraulic connection of FIG. 3 provided with a cover, FIG. 5 shows a detailed view of the movable connector part of the hydraulic connection of FIG. 3, parked in a holding means, FIG. 6 shows the fixed connector part of the hydraulic connection and three sets of connectable fittings, FIG. 7 shows the holding means and three sets of connectable fittings, FIG. 8 shows the fixed connector part in detail, FIG. 9 shows the holding means in detail, FIG. 10 shows a view of the movable connector part connected to the fixed connector part, FIG. 11 shows a view of the movable connector part connected to a fixed connector part, which is integrated with a valve block, FIG. 12 shows the movable connector part parked in the holding means, FIG. 13 shows 4 individual hydraulic couplings parked in the holding means, FIG. 14 shows 2 individual hydraulic couplings parked in the holding means, FIG. 15 shows a cover arranged on the holding means, FIG. 16 shows an electrical connection according to a second preferred embodiment, FIG. 17 shows a movable connector part according to a second preferred embodiment, FIG. 18 shows a fixed connector part according to a second preferred embodiment.

DETAILED DESCRIPTION OF THE INVENTION

FIG. 1 shows a schematic view of a work vehicle 1, i.e. a tractor, provided with a conventional hydraulic system comprising a hydraulic pump, a tank with hydraulic fluid and a number of conduits, connections and valves. The hydraulic system comprises a fixed connector part 10 according to the invention, which is adapted to be connected to a movable connector part 20 of a hydraulic system on a work equipment 2 to be used on the work vehicle 1.

Often, a work vehicle 1 is used for a number of different work tasks involving different work equipments 2. In the figures, the work equipment 2 is exemplified by a front loader unit, which is releasably attached to the work vehicle 1. In addition to the movable connector part 20, the front loader is provided with a hydraulic system comprising connections, conduits and pistons for lifting the loader and tilting the bucket. Other types of usable work equipments include digging aggregates, lifting aggregates, ploughs and the like. Generally, all these different types of equipments are adapted to be releasably attached to the work vehicle 1. Hence, the hydraulic connection unit of the work equipments 2, i.e. the movable connector part 20, must be adapted to be connected to/disconnected from the fixed connector part 10 of the hydraulic system on the work vehicle 1. Additionally, different tools may be connected to the work equipment 2. The tools generally also include hydraulic systems, which systems need to be connected to the hydraulic system of the work vehicle, via the hydraulic system of the work equipment 2. These connections might or might not be of the same type as the connections between the work equipment 2 and the work vehicle 1. For the sake of simplicity, only the connection between the work equipment 2 and the work vehicle 1 is described in this application. The invention may however also be used at the connection between the work equipment 2 and the tool.

FIGS. 1-2 shows the work vehicle 1 when the work equipment 2 is arranged on it. In this state, the movable connector part 20 is connected to the fixed connector part 10, and a cover 40 is arranged to protect a holding means 30, which is arranged on the work equipment 2.

In FIGS. 3-5, the work equipment 2 is disconnected from the work vehicle 1. In this state the movable connector part 20 is parked in the holding means 30, and the cover 40 is instead arranged on the fixed connector part 10 in order to protect it.

According to the present invention a multi coupling arrangement is provided between the hydraulic system of the work vehicle and the hydraulic system of the front loader. As indicated above the multi coupling arrangement comprises two parts, wherein one fixed connector part 10 is connected to the hydraulic conduits of the work vehicle 1, and one movable connector part 20 is arranged on the work equipment 2. The fixed connector part 10 is preferably fixedly attached to the work vehicle on a suitable location where it does not interfere with the function of the work vehicle and/or the attached work equipment 2. The fixed connector part 10 of the multi coupling comprises a housing on which a number of conduit attachments are arranged.

Depending on the type of work vehicle 1 and its hydraulic system, the fixed connector part 10 of the present invention may be integrated in a valve block 3. However, on some work vehicles the valve block 3 is included in the hydraulic system of the work vehicle. In such a case the fixed connector part 10 and the valve block 3 may be configured as separate parts that are interconnected by hydraulic conduits.

In the shown embodiment the fixed connector part 10 is integrated in the valve block 3. An inlet conduit 11a for pressurised hydraulic fluid from the pump of the hydraulic system of the work vehicle 1 and a return conduit 11b for returning hydraulic fluid to the tank of the hydraulic system is connected to the valve block 3. Further, an electric cable 12 is connected to the valve block 3 for furnishing electricity to the work equipment. Often, wires (not shown) are connected to the valve block for allowing the operator to control the fluid in the valve block 3 and thus the functions of the work equipment 2. Generally the valve block 3 includes 2 spool valves, which are regulated by the wires and which control the passages of the hydraulic fluid. The control of the valves may also be electrically handled, wherein no wires are connected to the valve block 3.

As is best shown in FIG. 6 and FIG. 8, the fixed connector part 10, is provided with a central bar 13 comprising engagement pegs 16 for enabling coupling to the fixed connector part 10. Further, it comprises four conduit couplings 14a-d for the hydraulic lines, and an electric connection 15, which in the embodiment shown in FIGS. 1-15 is provided on the top of the central bar 13.

A movable connector part 20 in accordance with the invention may be connected to the fixed connector part 10 in one single operation. The movable connector part 20 comprises a number of conduit openings having a configuration and design to mate with the conduit couplings 14a-d of the fixed connector part 10, such that each conduit opening is connected in a fluid tight manner to the corresponding conduit coupling 14a-d of the fixed connector part for providing fluid tight passages for the hydraulic fluid. Further the movable connector part 20 comprises an electric connection mating with the electric connection 15 of the fixed connector part 10. Both the fixed connector part 10 and the movable connector part 20 are configured such that any dripping of fluid is avoided in both the connected and the disconnected state. The fluid connections in them selves are well known to he skilled person and are therefore not described in detail in this application. In the shown embodiment, the actual connection of the movable connector part 20 to the fixed connector part 10 is enabled at the central bar 13, as is described below.

The movable connector part 20 is provided with a central bore (not shown). Inside the bore, a sleeve (not shown) is arranged rotary around its own longitudinal axis. The sleeve constitutes the female part of the coupling and is designed to mate with the central bar 13 of the fixed connector part 10, the central bar 13 constituting the male part of the coupling. A lever 23 (see e.g. FIG. 6) is attached to the sleeve for rotating the same and protrudes through an opening 27 in the housing of the movable connector part 20. The sleeve of the movable connector part 20 is provided with curved grooves (not shown) on its inner surface, and when the lever 23 is turned to rotate the sleeve, the grooves on the inner surface of the sleeve interact with the engagement pegs 16 on the bar 13, whereby the parts are forced towards each other and locked to each other. A blocking pin 26 is arranged to keep the lever in the closed position when the movable connector part 20 is attached to the fixed connector part 10. The coupling of the movable connector part 20 to the fixed connector part 10 may be designed in many different manners. For instance each of the conduit couplings 14a-d may be provided with locking means mating with locking means on the movable connector part. Other types of couplings are also known in the art, i.e. from EP 0 522 493, as cited above. Hence the coupling between the fixed connector part 10 and the movable connector part 20 is not restricted to the shown embodiment.

An important feature of the fixed connector part 10 is that it is also conceivable to connect conventional individual hydraulic couplings to it. Thus, it is not necessary to provide all work equipments 2 that are to be connected to a work vehicle 1 provided with a fixed connector part 10 according to the invention with a movable connector part 20.

From FIGS. 6 and 8, it is apparent that all individual hydraulic connections 14a-d are configured as conventional hydraulic quick couplings, which may be directly connected and locked to individual hydraulic couplings of a work equipment without use of a multi coupling. Preferably the quick coupling are of a standard type. e.g. as certified under ISO 16028.

Thus, as is shown in FIGS. 6, 13 and 14, individual hoses 21a-d and optionally an electric cable 22 may be individually coupled to the fixed connector part 10. In the shown embodiment the hoses 21a-d are each provided with individual female parts 24a-d of a hydraulic quick coupling mating with the corresponding male parts 14a-d of the fixed connector part 10. The electric cable 22 is coupled via an electric connector housing 25, adapted to mate with the bar 13 of the fixed connector part 10, and thus comprising a bore for receiving the bar 13 and tracks 18 for receiving the engagement pegs 16 of the bar. The tracks 18 are configured as key holes, i.e. with a circular top which fits tightly around the engagement pegs 16, and with narrow part separating the circular part from the lower linear part of the track 18. The narrow part locks the connector housing 25 to the central bar 13.

In certain applications only two hydraulic couplings are needed, e.g. when the work equipment comprises only one hydraulic cylinder. Such an arrangement is shown in FIG. 14, where two of the connections are left uncoupled. In FIG. 14, the couplings 24a and 24b are coupled to openings 34b and 34c of a holding means 30. They may of course, in use, be connected in a corresponding manner to a fixed connector part 10 of a work vehicle 1.

As mentioned above and according to another aspect of the invention a holding means 30 or a "parking slot" is arranged on the work equipment 2 on a suitable location where it does not interfere with the function of the work equipment. The holding means 30 is designed such that it mates with the movable connector part 20. Thus, it resembles the fixed connector part 10 and comprises an upper surface 32 arranged to correspond to and co-act with the connection surface of the movable connector part 20, in order to protect the connection surface of the movable connector part when attached to the holding means 30. The holding means 30 is provided with a central bar 33 corresponding to the bar 13 of the fixed hydraulic connection part 10, with or without engagement pegs (corresponding to the engagement pegs 16 of the fixed connector part 10). In the shown embodiment the bar 33 is not provided with engagement pegs. The holding means 30 is instead provided with a rim 31, inside which the movable connector part 20 fits tightly, such that it is efficiently held at place. Further, the holding means 30 is adapted to receiving conventional hydraulic couplings. Openings 34a-d are arranged in the holding means 30, which are dimensioned to house individual couplings 24a-d, see e.g. FIG. 13. Consequently, a holding means 30 is preferably arranged on all work equipments 2 that are to be used on the work vehicle 1, regardless of the type of connection the hydraulic system of the work equipment 2 is provided with.

When the work equipment 2 is not to be used any more, the movable connector part 20 is disconnected from the fixed connector part 10 on the work vehicle and inserted into the holding means 30 in which it fits tightly and remains fixed. The movable connector part 20 is thus kept out of the way and is at the same time protected from the environment, such that dirt, debris, ice, snow etc. is kept away from its connection surface. Conventionally the connection part of the work equipments have been left exposed to the environment, which of course may lead to all kinds of problems, including total failure of the connector part due to impact with neighbouring objects, and heavy soiling of both the connector part and the environment due to spillage of hydraulic fluid.

If the work equipment 2 is furnished with individual quick couplings 24a-d instead of a movable connector part 20, these may be individually housed in the openings of the holding means 30, and the electric connector housing 25 may be arranged on the central bar 13.

A second protecting means, in form of a cover 40, is provided in accordance with the present invention on the one hand for protecting the fixed connector part 10 when the movable connector part 20 is not connected to it, and on the other for protecting the holding means 30 when the movable connector part 20 is connected to the fixed connector part 10. The cover 40 is arranged as a lid with a lower surface that corresponds to the lower surface of the movable connector part 20, such that it fits the upper surface of the fixed connector part 10 and the holding means 30. The cover 40 may further be arranged with a central sleeve which protrudes through an opening in the cover, and is connected to a knob 41 for turning the sleeve around its longitudinal axis. The sleeve may have the same configuration as the sleeve of the movable connector part 20, which enables the sleeve to be attached to the central bar 13 of the fixed connector part 10 in order to protect the hydraulic connections of the fixed connector part 10 when it is not in use. On the other hand, when the hydraulic system of the equipment is connected to the hydraulic system of the work vehicle, the cover is attached to the holding means 30 in order to protect the holding means 30 from dirt and debris. Thus, the holding means 30 and the cover 40 provides a full protection of the hydraulic connection parts of the present invention both during use and when parked.

A second preferred embodiment of the invention is shown in FIGS. 16-18. In FIG. 16, an individual electrical connection part 15' is shown. An advantage of the second preferred embodiment of the invention is that the electrical connection part 15' is of a conventional type, which is readily available on the market, such that spare parts may be easily available.

Also, as is shown in FIG. 17, the movable connector part 20 may be provided with a corresponding electrical connection 15' that is fixed to its outer part. Accordingly, the fixed connector part 10 (as is shown in FIG. 18) is provided with a mating electrical connector part 15". Preferably, the fixed connector part 10 is provided with the male part of the connector, such that no upward open recess is formed on the fixed connector part 10, whereby the possibility of collecting dust or similar is minimised.

The fixed connector part 10 may thus be connected either to individual hydraulic couplings and an individual electrical connection 15', or to a movable connector part 20, which may or may not involve an electrical connection 15'. The electrical connection parts 15' and 15" may include snap connections 51a and 51b, such that an individual electrical connection 15' may be releasably connected to the electrical connection 15" of the fixed connector part. An electrical connection 15' that is integrated onto a movable connector part 10 is preferably not provided with such a snap in connection. Instead, the movable connector part 20 is rigidly connected to the fixed connector part 10 by means of the central bar 13' with the engagement pegs 16 on the fixed connector part 10, which interact with curved grooves on the inner surface of a sleeve (not shown) in the movable connector part 20. As described above, the lever 23 is connected to the sleeve, such that the movable connector part 20 may be locked to the fixed connector part 10 by rotating the lever 23. This overall connection simultaneously secures the four hydraulic conduit couplings 14a-d and the electric connection parts 15' to their corresponding connection.

When the second preferred embodiment of the invention is implemented, a holding means (not shown) that mates the movable connector part 20 according to the second embodiment shall be used, as well as a cover (not shown) that is adapted to mate with the fixed connector part 10 of the second embodiment and the corresponding holding means.

As can be readily understood from the above the present invention may be designed in many ways without departing from the scope of protection as defined by the claims. It is thereby to be understood that the embodiments described above and shown in the drawings are to be regarded as non-limiting examples.

The invention claimed is:

1. In combination:
   a fixed connector part adapted to constitute an end part of a hydraulic system of a work vehicle and intended to be fixedly arranged on the work vehicle, the fixed connector part having a plurality of hydraulic couplings,
   a hydraulic system of a work equipment having hydraulic couplings comprising either a movable connector part having a plurality of hydraulic couplings or a plurality of individual hydraulic connections, each having a hydraulic coupling,
   the movable connector part being connectable to the fixed connector part by first and second locking devices, the first locking device located on the fixed connector part and the second locking device located on the movable connector part, the first and second locking devices being connectable to lock the movable connector part to the fixed connector part with their respective hydraulic couplings connected to each other for fluid flow therethrough,
   the hydraulic couplings of the fixed connector part being constructed to be hydraulically coupled to the hydraulic couplings of the movable connector part and alternatively to the hydraulic couplings of the plurality of individual hydraulic connections, and
   wherein the hydraulic couplings of the fixed connector part are configured as standard quick couplings as certified under ISO 16028, which may be directly connected and locked to individual hydraulic couplings of a work equipment without use of a movable connector part.

2. The invention of claim 1, wherein the fixed connector part is an integrated part of a valve block of the hydraulic system on the work vehicle.

3. The invention of claim 1, wherein the first locking device comprises a bar provided with engagement pegs on its outer surface, wherein the bar is configured as a male part of a coupling adapted to interact with a female part in form of a sleeve on the movable connector part, the sleeve including curved tracks that mate with the engagement pegs, such that when the sleeve is rotated about its longitudinal axis the interaction between the tracks and the engagement pegs brings the two parts into connection, the fixed part also having an electrical connection, which is separate from the bar and adapted to be connected to either a separate electrical connection or an electrical connection that is integrated in the movable connector part.

4. In combination:
   a fixed connector part adapted to constitute an end part of a hydraulic system of a work vehicle and intended to be fixedly arranged on the work vehicle, the fixed connector part having a plurality of hydraulic couplings,
   a hydraulic system of a work equipment having hydraulic couplings comprising either a movable connector part having a plurality hydraulic couplings or a plurality of individual hydraulic connections, each having a hydraulic coupling,
   the movable connector part being connectable to the fixed connector part by first and second locking devices, the first locking device located on the fixed connector part and the second locking device located on the movable connector part, the first and second locking devices being connectable to lock the movable connector part to the fixed connector part with their respective hydraulic couplings connected to each other for fluid flow therethrough,
   the hydraulic couplings of the fixed connector part being constructed to be hydraulically coupled to the hydraulic couplings of the movable connector part and alternatively to the hydraulic couplings of the plurality of individual hydraulic connections,
   wherein the hydraulic couplings of the fixed connector part are configured as standard quick couplings as certified under ISO 16028, which may be directly connected and locked to individual hydraulic couplings of a work equipment without use of a movable connector part, and
   wherein the fixed connector part comprises an electric connector part connectable to either a separate electric connector or to the movable connector part.

5. A fixed connector part adapted to constitute an end part of a hydraulic system of a work vehicle and intended to be fixedly arranged on the work vehicle, the fixed connector part having a plurality of hydraulic couplings,
   a hydraulic system of a work equipment having hydraulic couplings comprising either a movable connector part having a plurality of hydraulic couplings or a plurality of individual hydraulic connections, each having a hydraulic coupling,
   the movable connector part being connectable to the fixed connector part by first and second locking devices, the first locking device located on the fixed connector part and the second locking device located on the movable connector part, the first and second locking devices being connectable to lock the movable connector part to the fixed connector part with their respective hydraulic couplings connected to each other for fluid flow therethrough,
   the hydraulic couplings of the fixed connector part being constructed to hydraulically couple to either the hydraulic couplings of the movable connector part or the hydraulic couplings of the plurality of individual hydraulic connections, and including a holding device constructed to be arranged on the work equipment for parking of the movable connector part when the work equipment is not attached to the work vehicle.

6. The invention of claim 5, wherein the holding device comprises recesses for receiving and protecting individual hydraulic couplings.

7. In combination:

a fixed connector part adapted to constitute an end part of a hydraulic system of a work vehicle and intended to be fixedly arranged on the work vehicle, the fixed connector part having a plurality of hydraulic couplings, a hydraulic system of a work equipment having hydraulic couplings comprising either a movable connector part having a plurality of hydraulic couplings or a plurality of individual hydraulic connections, each having a hydraulic coupling, the movable connector part being connectable to the fixed connector part by first and second locking devices, the first locking device located on the fixed connector part and the second locking device located on the movable connector part, the first and second locking devices being connectable to lock the movable connector part to the fixed connector part with their respective hydraulic couplings connected to each other for fluid flow therethrough, the hydraulic couplings of the fixed connector part being constructed to be hydraulically coupled to the hydraulic couplings of the movable connector part and alternatively to the hydraulic couplings of the plurality of individual hydraulic connections, wherein the hydraulic couplings of the fixed connector part are configured as conventional hydraulic couplings, which may be directly connected and locked to individual hydraulic couplings of a work equipment without use of a movable connector part, and including a cover arranged to protect the hydraulic couplings of the fixed connector part when the movable connector part is disconnected from the fixed connector part.

8. A fixed connector part adapted to constitute an end part of a hydraulic system of a work vehicle and intended to be fixedly arranged on the work vehicle, the fixed connector part having a plurality of hydraulic couplings, a hydraulic system of a work equipment having hydraulic couplings comprising either a movable connector part having a plurality of hydraulic couplings or a plurality of individual hydraulic connections, each having a hydraulic coupling, the movable connector part being connectable to the fixed connector part by first and second locking devices, the first locking device located on the fixed connector part and the second locking device located on the movable connector part, the first and second locking devices being connectable to lock the movable connector part to the fixed connector part with their respective hydraulic couplings connected to each other for fluid flow therethrough, the hydraulic couplings of the fixed connector part being constructed to hydraulically couple to either the hydraulic couplings of the movable connector part or the hydraulic couplings of the plurality of individual hydraulic connections, including a cover arranged to protect the hydraulic couplings of the fixed connector part when the movable connector part is disconnected from the fixed connector part, and including a holding device constructed to be arranged on the work equipment for parking the movable connector part when the work equipment is not attached to the work vehicle, and wherein the cover is also constructed to fit the holding device.

9. A fixed connector part adapted to constitute an end part of a hydraulic system of a work vehicle and intended to be fixedly arranged on the work vehicle, the fixed connector part having a plurality of hydraulic couplings for cooperating with a hydraulic system of a work equipment which has hydraulic couplings comprising either (1) a movable connector part with a plurality of hydraulic couplings or (2) a plurality of individual hydraulic connections, each having a hydraulic coupling, the movable connector part which can cooperate with the fixed connector part being connectable to the fixed connector part by first and second locking devices, the first locking device located on the fixed connector part and the second locking device located on the movable connector part, the first and second locking devices being connectable to lock the movable connector part to the fixed connector part with their respective hydraulic couplings connected to each other for fluid flow therethrough, the hydraulic couplings of the fixed connector part being constructed to be hydraulically coupled to the hydraulic couplings of the movable connector part and alternatively to the hydraulic couplings of the plurality of individual hydraulic connections, and wherein the hydraulic couplings of the fixed connector part are configured as standard quick couplings as certified under ISO 16028, which may be directly connected and locked to individual hydraulic couplings of a work equipment without use of a movable connector part.

10. A fixed connector part according to claim 9, wherein the fixed connector part is an integrated part of a valve block of the hydraulic system on the work vehicle.

11. A fixed connector part according to claim 9, wherein the first locking device comprises a bar provided with engagement pegs on its outer surface, wherein the bar is configured as a male part of a coupling adapted to interact with a female part in form of a sleeve on the movable connector part, the sleeve including curved tracks that mate with the engagement pegs, such that when the sleeve is rotated about its longitudinal axis the interaction between the tracks and the engagement pegs brings the two parts into connection, the fixed part also having an electrical connection, which is separate from the bar and adapted to be connected to either a separate electrical connection or an electrical connection that is integrated in the movable connector part.

12. A fixed connector part adapted to constitute an end part of a hydraulic system of a work vehicle and intended to be fixedly arranged on the work vehicle, the fixed connector part having a plurality of hydraulic couplings for cooperating with a hydraulic system of a work equipment which has hydraulic couplings comprising either (1) a movable connector part with a plurality of hydraulic couplings or (2) a plurality of individual hydraulic connections, each having a hydraulic coupling, the movable connector part which can cooperate with the fixed connector part being connectable to the fixed connector part by first and second locking devices, the first locking device located on the fixed connector part and the second locking device located on the movable connector part, the first and second locking devices being connectable to lock the movable connector part to the fixed connector part with their respective hydraulic couplings connected to each other for fluid flow therethrough, the hydraulic couplings of the fixed connector part being constructed to be hydraulically coupled to the hydraulic couplings of the movable connector part and alternatively to the hydraulic couplings of the plurality of individual hydraulic connections, wherein the hydraulic couplings of the fixed connector part are configured as standard quick couplings as certified under ISO 16028, which may be directly connected and locked to individual hydraulic couplings of a work equipment without use of a movable connector part, and wherein the fixed connector part comprises an electric connector part connectable to either a separate electric connector or to the movable connector part.

13. A fixed connector part adapted to constitute an end part of a hydraulic system of a work vehicle and intended to be fixedly arranged on the work vehicle, the fixed connector part having a plurality of hydraulic couplings for cooperating with a hydraulic system of a work equipment which has hydraulic couplings comprising either (1) a movable connector part with a plurality of hydraulic couplings or (2) a plurality of individual hydraulic connections, each having a hydraulic coupling, the movable connector part which can cooperate with the fixed connector part being connectable to the fixed connector part by first and second locking devices, the first locking device located on the fixed connector part and the second locking device located on the movable connector part, the first and second locking devices being connectable to lock the movable connector part to the fixed connector part with their respective hydraulic couplings connected to each other for fluid flow therethrough, the hydraulic couplings of the fixed connector part being constructed to be hydraulically coupled to the hydraulic couplings of the movable connector part and in addition constructed to be coupled to the hydraulic couplings of the plurality of individual hydraulic connections, and including a holding device constructed to be arranged on the work equipment for parking of the movable connector part when the work equipment is not attached to the work vehicle.

14. A fixed connector part according to claim 13, wherein the holding device comprises recesses for receiving and protecting individual hydraulic couplings.

15. In combination:

a fixed connector part adapted to constitute an end part of a hydraulic system of a work vehicle and intended to be fixedly arranged on the work vehicle, the fixed connector part having a plurality of hydraulic couplings, a hydraulic system of a work equipment having hydraulic couplings comprising either a movable connector part having a plurality of hydraulic couplings or a plurality of individual hydraulic connections, each having a hydraulic coupling, the movable connector part being connectable to the fixed connector part by first and second locking devices, the first locking device located on the fixed connector part and the second locking device located on the movable connector part, the first and second locking devices being connectable to lock the movable connector part to the fixed connector part with their respective hydraulic couplings connected to each other for fluid flow therethrough, the hydraulic couplings of the fixed connector part being constructed to be hydraulically coupled to the hydraulic couplings of the movable connector part and alternatively to the hydraulic couplings of the plurality of individual hydraulic connections, wherein the hydraulic couplings of the fixed connector part are configured as conventional hydraulic couplings, which may be directly connected and locked to individual hydraulic couplings of a work equipment without use of a movable connector part, and including a cover arranged to protect the hydraulic couplings of the fixed connector part when the movable connector part is disconnected from the fixed connector part.

16. A fixed connector part adapted to constitute an end part of a hydraulic system of a work vehicle and intended to be fixedly arranged on the work vehicle, the fixed connector part having a plurality of hydraulic couplings for cooperating with a hydraulic system of a work equipment which has hydraulic couplings comprising either (1) a movable connector part with a plurality of hydraulic couplings or (2) a plurality of individual hydraulic connections, each having a hydraulic coupling, the movable connector part which can cooperate with the fixed connector part being connectable to the fixed connector part by first and second locking devices, the first locking device located on the fixed connector part and the second locking device located on the movable connector part, the first and second locking devices being connectable to lock the movable connector part to the fixed connector part with their respective hydraulic couplings connected to each other for fluid flow therethrough, the hydraulic couplings of the fixed connector part being constructed to be hydraulically coupled to the hydraulic couplings of the movable connector part and in addition, constructed to be coupled to the hydraulic couplings of the plurality of individual hydraulic connections, including a cover arranged to protect the hydraulic couplings of the fixed connector part when the movable connector part is disconnected from the fixed connector part, and including a holding device constructed to be arranged on the work equipment for parking the movable connector part when the work equipment is not attached to the work vehicle, and wherein the cover is also constructed to fit the holding device.

\* \* \* \* \*